Figure 1:
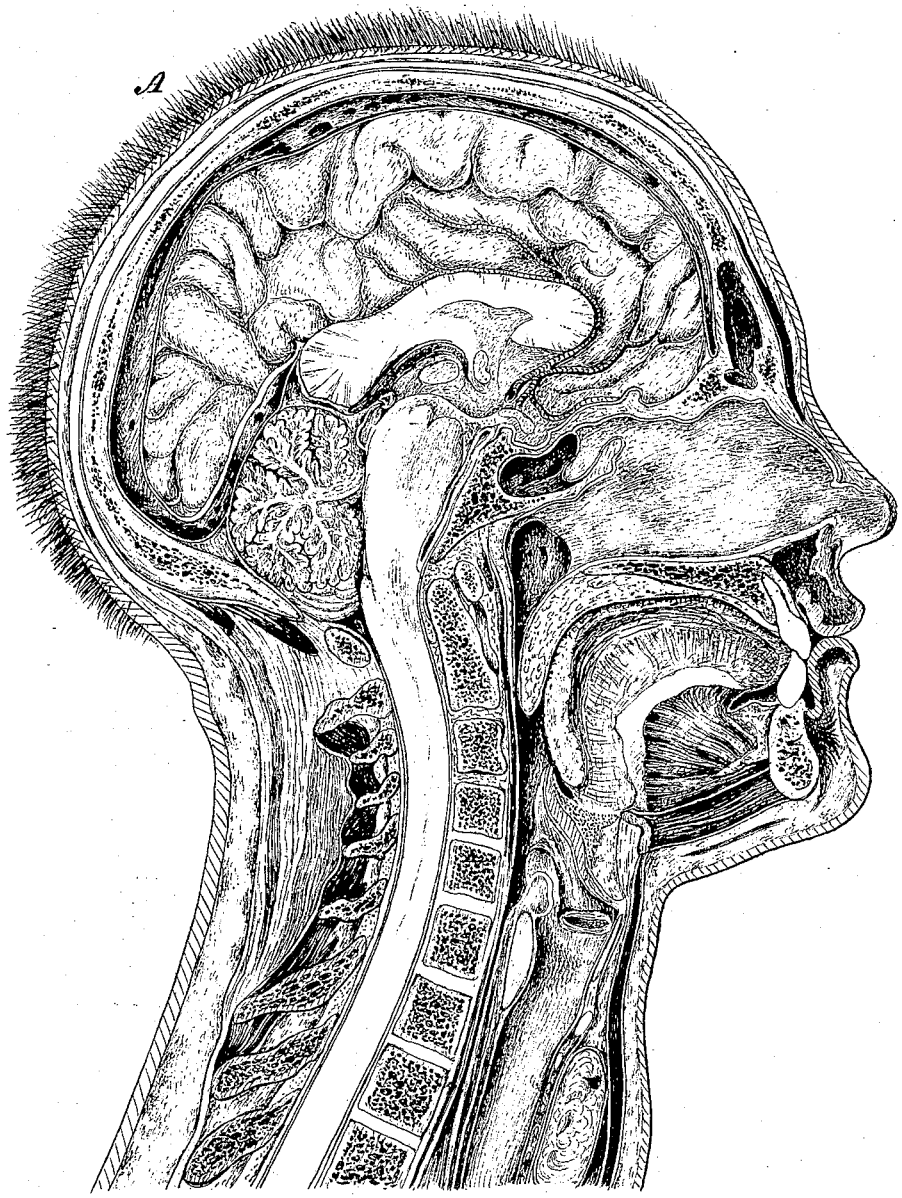

(No Model.)

2 Sheets—Sheet 1.

M. E. GUIREY.
FIGURE, MAP, AND CHART FOR EDUCATIONAL PURPOSES.

No. 298,746.   Patented May 20, 1884.

Witnesses:
T. C. Brecht
J. A. Rutherford.

Inventor:
Mary E. Guirey,
James L. Norris.
Attorney.

(No Model.)
M. E. GUIREY.
FIGURE, MAP, AND CHART FOR EDUCATIONAL PURPOSES.
No. 298,746. Patented May 20, 1884.
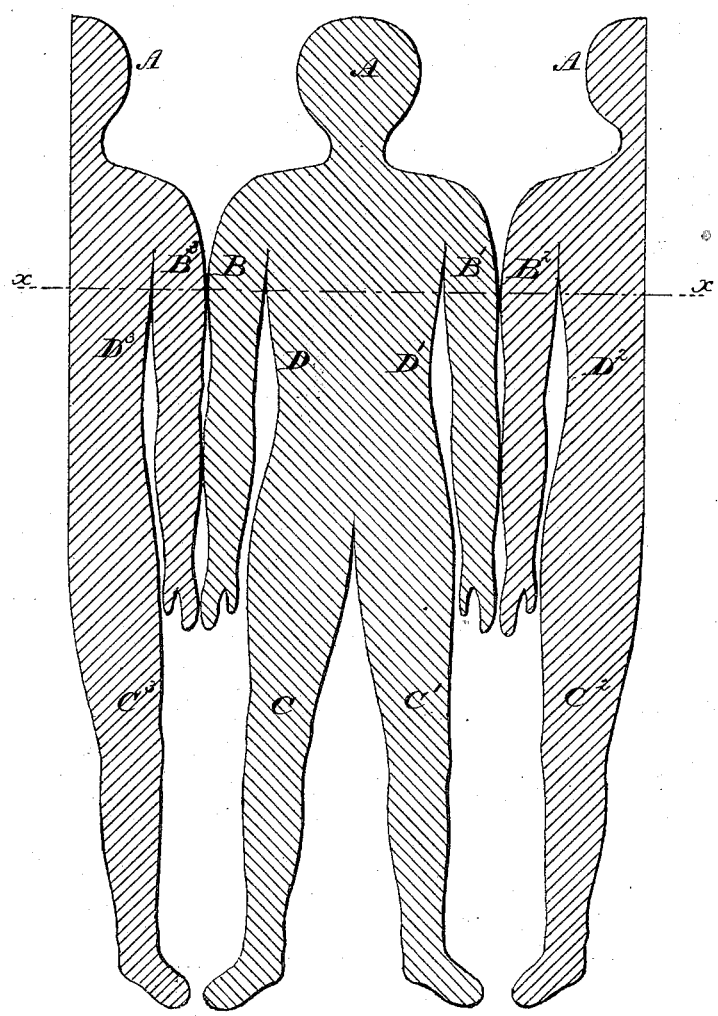
Fig. 2.
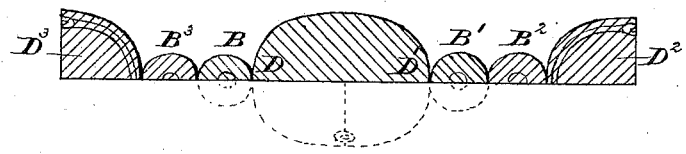
Fig. 3.
Witnesses:
T. C. Brecht
J. A. Rutherford
Inventor:
Mary E. Guirey
James L. Norris,
Attorney.

UNITED STATES PATENT OFFICE.

MARY E. GUIREY, OF SAN FRANCISCO, CALIFORNIA.

FIGURE, MAP, AND CHART FOR EDUCATIONAL PURPOSES.

SPECIFICATION forming part of Letters Patent No. 298,746, dated May 20, 1884.

Application filed September 28, 1883. (No model.)

*To all whom it may concern:*

Be it known that I, MARY E. GUIREY, a citizen of the United States, residing at San Francisco, in the county of San Francisco and State of California, have invented new and useful Improvements in Figures, Maps, and Charts for Educational Purposes, of which the following is a specification.

The object of my invention is to facilitate the communication of physiological knowledge and furnish practical means by which to study and to teach the structure of the different parts of the human body by the natural method of object-teaching.

To this end my invention consists in forming a figure, map, or chart in bas-relief, showing divisional views of the whole or different parts of the human body, which sectional views or parts may be hinged together, so as to fold and form one or more parts or members of the body.

My invention is especially useful in teaching physiology where the pupils have not the advantages of access to the dissecting-room or to the manikin; and it affords simple and inexpensive means for imparting the instruction, and can be used to advantage and profit in all elementary schools.

Figure 1 of the drawings shows a portion of the human head, showing parts in bas-relief. Fig. 2 is an outline view of the human body, the central figure representing a division through the body, in which the inner parts will be in bas-relief, and the side figures division thereof taken on a vertical line through the center of the middle figure. Fig. 3 is a cross-section through Fig. 2 on the line $x\ x$, showing in full lines different parts or members of the figure when separated from other parts, and in dotted lines the positions of those parts when forming the whole or perfect member.

In the drawings, the letter A indicates a human head and a portion of the neck in division, with different members or organs thereof made in bas-relief, and illustrating my invention when applied to a figure, map, or chart, while in Fig. 2, which is supposed to be a division through the body taken at right angles to Fig. 1, and which will show the inner parts of the body in bas-relief, the letters B and B' indicate the arms, C and C' the legs, and D D' the trunk, of the body. The right-hand figure of Fig. 2 is a vertical division of the parts of body corresponding to the parts B', C', and D', and lettered $B^2$, $C^2$, and $D^2$, and the left-hand figure a similar view of the parts corresponding to the parts B, C, and D, and lettered $B^3$, $C^3$, and $D^3$, the two side divisional figures being hinged at the points of contact indicated to the central divisional figure, and adapted, when folded over onto the central figure, to form therewith the full outlines of the human body, as indicated by full and dotted lines in Fig. 3 of the drawings, which is a cross-section through the trunk and arms of the body on the line $x\ x$ of Fig. 2.

I have shown and described the figures as vertical divisions through the body, but merely for purposes of illustration, as the divisions may be transverse instead of vertical, or both transverse and vertical, or on any other line or lines desired, without departing from the spirit of my invention, provided that the inner parts of the body are represented in bas-relief. The pivotal joints or hinges of the divisions may be formed of strips of any flexible material, or formed of metal, and of any shape or construction suitable or practicable, and the material of which the figures are composed may be papier-maché or any plastic or other suitable material, which will be molded or otherwise formed to the desired configuration. The figures will always be in divisions, so that when brought together they will form the whole body, illustrating or representing the inner parts or organs of the body and their connections; but the divisions need not be hinged together, for whether they be made to fold upon one another or appear only as a map or chart with parts in bas-relief the same will embrace my invention.

By constructing the parts as described, so as to illustrate in bas-relief the inner parts or organs of the human body, pupils can be readily instructed in physiology, and at the same time the instruction will be imparted in such a manner that it will be both interesting and entertaining, and the impressions made upon the mind rendered more permanent than when otherwise made. The construction furthermore affords an inexpensive means for teaching physiology, and brings it within the reach of institutions and persons of limited pecuniary means, so that it can be used generally for elementary instruction. It is obvious that it may also be used for illustrating the different races of men, and that the figures may be dressed to illustrate the costumes of different races of people, and for other purposes.

In connection with my figure, map, or chart, I propose to use a bottle or vial, E, which will be formed with a series of variegated or different-colored lines, to illustrate the different principles comprising or embraced within the different tissues or parts of the body, which vial will be used in place of the tablet or label ordinarily used in connection with maps in object-teaching.

Having thus described my invention, what I claim is—

As a new article of manufacture, a figure, map, or chart showing divisional views of the whole or different inner parts of the human body in bas-relief, substantially as described.

In testimony whereof I have hereunto set my hand in the presence of two subscribing witnesses.

MARY E. GUIREY.

Witnesses:
JAMES L. NORRIS,
J. A. RUTHERFORD.